May 20, 1952 H. A. ALEXANDERSON ET AL Re. 23,490
CONTROL DEVICE FOR THE POWER UNITS OF AIRCRAFT
Original Filed May 29, 1945
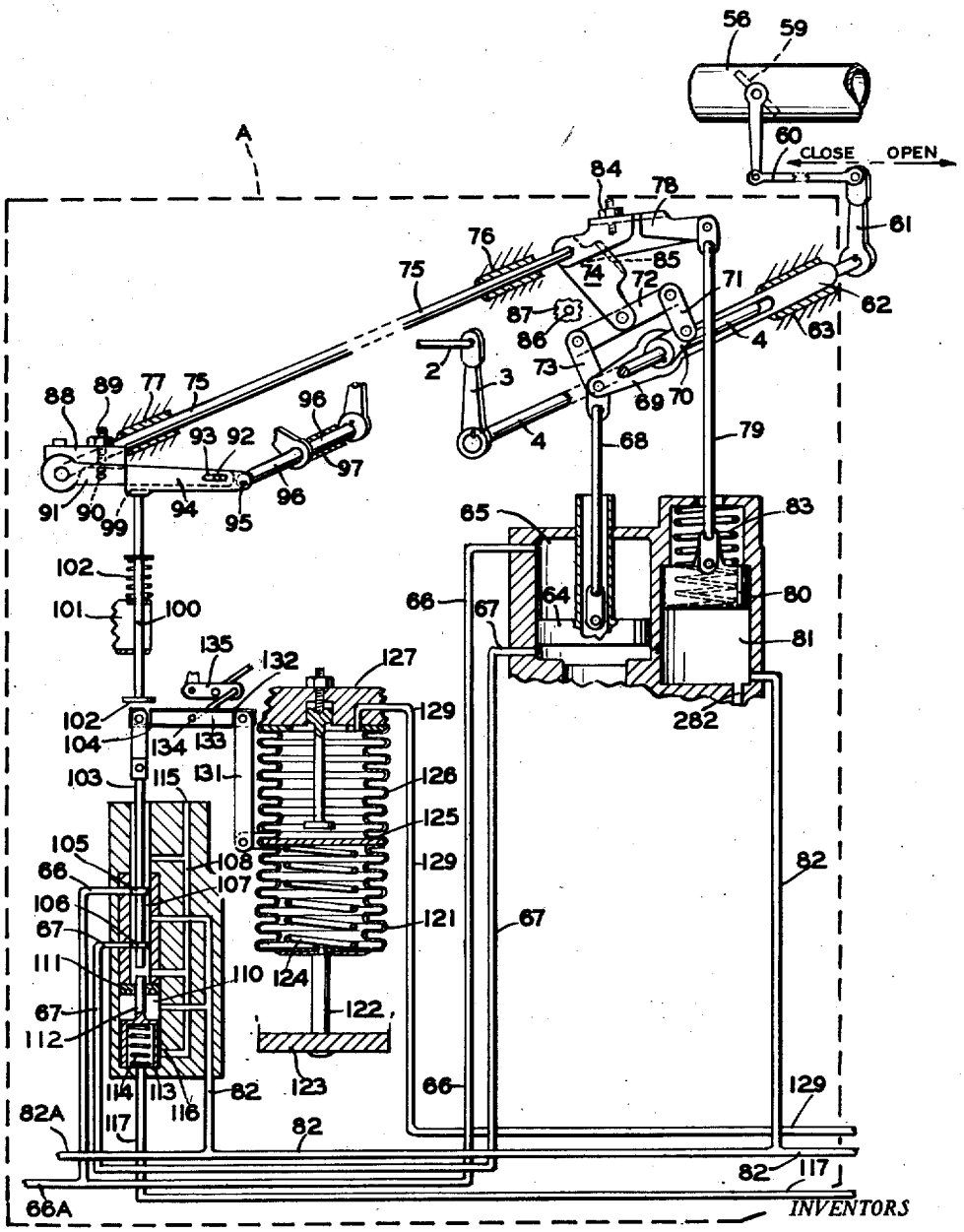
INVENTORS
HOWARD A. ALEXANDERSON
ROBERT Z. HAGUE
BY Herbert L. Davis Jr.
ATTORNEY Reissued May 20, 1952 Re. 23,490

UNITED STATES PATENT OFFICE 23,490

CONTROL DEVICE FOR THE POWER UNITS OF AIRCRAFT

Howard A. Alexanderson, Hohokus, and Robert Z. Hague, Oradell, N. J., assignors to Bendix Aviation Corporation, Teterboro, N. J., a corporation of Delaware Original No. 2,538,777, dated January 23, 1951, Serial No. 12,784, March 3, 1948, which is a division of Serial No. 596,472, May 29, 1945. Application for reissue June 27, 1951, Serial No. 233,764

7 Claims. (Cl. 121—41)

Matter enclosed in heavy brackets [ ] appears in the original patent but forms no part of this reissue specification; matter printed in italics indicates the additions made by reissue.

The present application is *for a reissue of U. S. Patent No. 2,538,777, granted January 23, 1951, on an application Serial No. 12,784, filed March 3, 1948, as* a division of U. S. application Serial No. 596,472, filed May 29, 1945, by Howard A. Alexanderson and Robert Z. Hague and relates to improved control devices for the power units of aircraft.

An object of the invention is to provide a novel linkage arrangement for alternately effecting automatic or manual control.

Another object of the invention is to provide a novel linkage for effecting manual control upon failure of the operating medium for the automatic control.

Another object of the invention is to provide novel linkage means for effecting direct manual control upon failure of a normally operative automatic motor means.

Another object of the invention is to provide a novel linkage arrangement, including a walking beam operative in one sense for interconnecting a manually operated shaft and a second shaft to be controlled, and the walking beam operative in a second sense for permitting movement of said second shaft by an automatic motor means free of said first mentioned shaft, and a means for locking said walking beam from the latter operation upon failure of the operating medium for the motor means.

The above and other objects and features of the invention will appear more fully hereinafter from a consideration of the following description taken in connection with the accompanying drawing wherein one embodiment of the invention is illustrated by way of example.

The drawing is a diagrammatic view of the novel linkage arrangement for effecting manual control upon failure of the operation medium for automatic control.

Referring to the drawing, a control lever 3 is keyed to a main control shaft 4 which extends into a control unit indicated in the drawing by the letter A. The control lever 3 is connected by a link 2 to a suitable pilot's operative control lever, not shown.

A throttle valve 59 controls an air inlet conduit 56 of an aircraft engine. The throttle valve 59 is controlled by a rod 60 operably connected as shown in the drawing to a throttle control arm 61.

The throttle control arm 61 is keyed to a shaft 62 rotatably mounted in a bearing formed in the casing of the control unit as indicated at 63. Rotatably mounted in the shaft 62 is one end of the shaft 4.

There is provided a servo piston 64 for operating the throttle 59 through shaft 62. The piston 64 is slidably mounted in a cylinder 65 having fluid pressure inlet passages 66 and 67 opening at opposite sides of the piston 64.

The piston 64 has a piston rod 68 pivotally connected at one end to the piston 64 and at the opposite end pivotally connected to an operating arm 69 formed integral with the rod 62.

Keyed to the pilot's control shaft 4 is a second arm 70 connected through a link 71 to one end of a walking beam 72. The opposite end of the walking beam 72 is connected through a link 73 to the arm 69.

Pivotally connected at a point intermediate the opposite ends of the walking beam 72 is one end of a lever arm 74 which is affixed at the opposite end to a shaft 75.

The shaft 75 is rotatably supported in bearing portions 76 and 77 formed apart of the control unit. Freely rotatable on the shaft 75 is an arm 78. The arm 78 is pivotally connected at the free end to a rod 79 which connects the arm 78 to a piston 80. The latter piston 80 is slidably mounted in a cylinder 81 into which opens at one end a passage 82 leading to a fluid pressure line such as oil under engine pressure. The piston 80 is normally forced under pressure of the oil in an upward direction as viewed in the drawing.

A spring 83 is positioned between the piston and the upper end of the cylinder so as to force the piston in a downward direction upon oil pressure failure, whereupon the arm 78 is forced in a clockwise direction. An adjustable screw 84 projects through the arm 78 and is arranged so as to engage an abutment plate 85 on the arm 74 in the latter event so as to restrain movement of the arm 74 in a counterclockwise direction. A stop pin 86 projects from a portion 87 of the casing of the unit so as to restrain the arm 74 from movement in an opposite direction.

The pilot's control lever may then effect manual control of the throttle valve 59 through shaft 4, arm 70, link 71, walking beam 72, link 73, arm 69 and throttle control shaft 62.

The adjustable screw 84 is preferably adjusted so as to permit a small amount of angular travel of lever 74 between screw 84 and stop pin 86. During such manual operation of the throttle 59, lever arm 74 is driven between its restraining stops 84 and 86 rotating shaft 75.

At the opposite end of the shaft 75 there is affixed an arm 88 through which projects an adjustable screw 89. The screw 89 is arranged to engage a pin 90 which projects from an arm 91, supported on shaft 75. The arm 91 is freely rotatable on the shaft 75 and includes a second pin 92 which projects therefrom into a slot 93 formed in an arm 94 freely rotatable on a pin 95 projecting from one end of a shaft 96. The shaft 96 is supported in a bearing 97 formed apart of the casing of the control and the shaft 96 may be rotatably adjusted as described and claimed in the copending divisional application Serial No. 129,132, filed November 3, 1949, by Robert Z. Hague and Howard A. Alexanderson and assigned to Bendix Aviation Corporation.

The arm 94 has an abutment plate 99 which bears upon one end of a plunger 100 slidably supported by bracket portions 101 and biased in an upward direction by spring 102. Lever arm 94 is driven by pin 92 of arm 91 so as to move plunger 100.

The plunger 100 is arranged so as to operably contact at 102 one end of a valve stem 103 which is biased under force of a leaf spring 104 in an upward direction. A valve stem 103 has valve members 105 and 106 arranged so as to control passages 66 and 67 respectively opening into valve chamber 107 and leading to chamber 65 at opposite sides of piston 64 so as to control the movement of the piston 64. The fluid pressure line 82 opens intermediate the openings of passages 66 and 67 to valve chamber 107. A fluid medium outlet or drain passage 108 also opens from the valve chamber 107 at the upper and lower sides of valves 105 and 106 respectively.

Another valve chamber 110 is provided separated from the valve chamber 107 by a sealing member 111. Projecting through the sealing member 111 is a valve stem 112. At the lower end of the valve stem 112 is mounted a cylindrical valve 113 having a spring 114 which tends to bias the valve 113 and stem 112 in an upward direction.

The fluid pressure passage 82 opens into the valve chamber 110 at the upper side of the valve 113 so that during normal operation the fluid pressure medium forces the valve 113 downward into the position shown in the drawing. The exhaust passage 108 has a port 115 opening into the housing of the control unit A and a port 116 opening into the chamber 110 but closed by the valve 113 when biased downward to the position shown in the drawing. A main drain passage 117 opens into the valve chamber 110. During normal operation the fluid medium is drained from the housing by suitable ports not shown.

When no pressure medium is available or upon oil pressure failure the drain valve 113 which is loaded by spring 114 is moved in an upward direction under force of the spring 114 serving two purposes. It causes the oil in the housing of the control unit A to drain to a predetermined low level by uncovering a drain port 116 so as to permit such drainage through port 115, passage 108, port 116, valve chamber 110 and through passage 117 to the fluid outlet. Secondly the spring 114 urges valve stem 112 upward into contacting relation with the lower end of the valve stem 103 so as to actuate the valve stem 103 in an upward direction.

During such fluid pressure failure, movement of the pilot's control lever [1] so as to move arm 70 in a counter-clockwise direction causes movement in a counter-clockwise direction of the lever arm 74 between its restraining stops 86 and 84 whereupon valve stem 112 under force of spring 113 causes servovalve to move from its neutral position as shown in the drawing, to an upper position so as to uncover the ports leading to passages 66 and 67 so as to permit movement of the throttle 59 manually. Similarly upon movement of the lever arm 74 in a clockwise direction between its restraining stops [85] *84* and 86 as upon manual movement of arm 70 in a clockwise direction lever arm 94 actuates through plunger 100 the valve stem 103 in a downward direction opening the ports to passages 66 and 67. It will be seen from the foregoing that the manual operation of the servovalve 103 not only permits the opening of the passages 65 and 67 so that the manual operation of arm 69 and accordingly throttle 59 may be effected, but in the event slight pressure be available such movement of the valve 103 directs such slight pressure so as to effect piston 64 so as to assist the manual movement of the arm 69 and thereby assist in the manual control of throttle valve 59.

The latter feature of effecting manual control of the position of the throttle upon pressure failure is described and claimed in the co-pending patent application Serial No. 596,472, filed May 29, 1945, by Howard A. Alexanderson and Robert Z. Hague and assigned to Bendix Aviation Corporation.

AUTOMATIC CONTROL OF THROTTLE

When fluid pressure is available in excess of a predetermined value, the piston 80 is moved upward under the pressure medium from passage 82 against the force of spring 83. This latter action forces link 79 upward moving lever 78 in a counter-clockwise direction so as to permit lever arm 74 to move free of the restraining screw 84. Likewise upon such fluid pressure medium becoming effective the valve 113 is moved downward against spring 114 permitting the servo-valve 103 to move free of the valve stem 112 under automatic control.

In order to effect the latter automatic control there is provided a pressure responsive bellows assembly including an evacuated bellows 121 supported at one end by a stud 122 carried by a portion 123 of the control unit A.

A spring 124 is positioned within the evacuated bellows 121 tending to expand the same. At the opposite end of the bellows 121 there is provided a movable plate 125 interposed between the bellows 121 and a second bellows 126. The bellows 126 is mounted at the opposite end by a portion 127 of the control unit A.

A passage 129 formed in the control unit leads from the interior of the bellows 126 to a conduit which leads to the air intake manifold conduit of the engine not shown herein. Thus the bellows 126 is controlled by the intake manifold pressure of the engine which is in turn affected by the position of the throttle valve 59.

The movable plate 125 between the manifold pressure bellows 126 and evacuated bellows 121 is connected through a link 131, leaf spring 132, beam 133 and the leaf spring 104 to the servovalve 103. Beam 133 in the schematic drawing contains at opposite ends the preloaded leaf springs 104 and 132 which permit deflection of the servo-valve 103 by plunger 100 and valve stem 112 without excessively loading the bellows assembly. The beam 133 may however be made in the form of a solid beam and link 131 provided with a preloading mechanism which maintains the link 131 at a fixed length.

The selected pressure or datum of the bellows assembly may be changed by moving a pin 134 on which beam 133 is pivotally supported. Pin 134 is adjusted through operation of suitable mechanism, such as disclosed and claimed in the copending parent application Serial No. 596,472, filed May 29, 1945, by Howard A. Alexanderson and Robert Z. Hague and assigned to Bendix Aviation Corporation.

It will be readily seen however from the foregoing that upon an increase in the intake manifold pressure above the selected pressure there will result an expansion of the manifold pressure bellows 126 causing the beam 133 to be shifted in a clockwise direction whereupon the servovalve 103 will be adjusted upward causing a pressure medium to be applied through the passage 66 to the upper side of the piston 64 and exhausting the lower side through passage 67. This action will cause the piston 64 to be adjusted downward so as to adjust the arm 69 in a counter-clockwise direction moving valve 59 of the drawing through rod 60 in a valve closing direction decreasing the intake manifold pressure until the valve 103 is returned to a neutral position. An opposite effect is of course produced upon the intake manifold pressure dropping below the selected value.

A conduit 282 leads from the piston chamber 81 for providing a fluid medium for further controlling the induction pressure through operation of suitable mechanism, while conduits 66A and 82A also lead to mechanism affecting the latter control as described and claimed in the copending parent application Serial No. 596,472, filed May 29, 1945, by Howard A. Alexanderson and Robert Z. Hague and divisional application Serial No. 111,896, filed August 22, 1949, by Howard A. Alexanderson and Robert Z. Hague and which applications are assigned to Bendix Aviation Corporation.

In the event of a hydraulic pressure failure the novel manually operable mechanical linkage 70, 71, 72, 73 and 74 is arranged so as to provide direct manual throttle control as heretofore explained. This linkage is particularly effective at the time of starting the aircraft engine. The manual throttle travel is sufficient to give normal power at take-off engine speed at sea level.

Although only one embodiment of the invention has been described and illustrated in detail, it is to be expressly understood that the same is not limited thereto. Various changes may be made in design and arrangement of the parts illustrated, as will be apparent to those skilled in the art. For a definition of the limits of the invention, reference should be had to the appended claims.

What is claimed is:

1. The combination comprising a first rotatable shaft, a second rotatable shaft, a walking beam operatively connecting said first and second rotatable shafts, stop means for limiting movement of said walking beam in a first sense and permitting movement of said walking beam in a second sense so as to drivingly connect said first and second rotatable shafts, and means for placing said stop means out of said limiting relation so as to permit movement of said walking beam in said [second] *first* sense.

2. The combination defined by claim 1 in which said first rotatable shaft is concentrically mounted relative to said second rotatable shaft.

3. The combination defined by claim 1 including a spring biased servo piston for operating said stop means.

4. The combination defined by claim 1 including a hydraulic motor means for rotatably positioning said [first] *second* shaft, and a spring biased servo piston for operating said stop means to drivingly connect said [motor means] *first shaft* to said second shaft through said walking beam upon the hydraulic pressure of the operating medium for said motor means [exceeding] *decreasing below* a predetermined value.

5. The combination comprising a first rotatable shaft, a second rotatable shaft concentrically mounted relative to said first shaft, a walking beam, first linkage means connecting one end of the walking beam to said first rotatable shaft, second linkage means connecting the opposite end of the walking beam to said second rotatable shaft, an arm pivotally supporting said walking beam at a point intermediate said opposite ends, said [arms] *arm* movable for permitting free movement of said first shaft relative to said second shaft, a second arm for locking said first mentioned arm from the latter movement while permitting pivotal movement of said walking beam relative to said first arm so as to drivingly connect said first rotatable shaft to said second rotatable shaft.

6. The combination defined by claim 5 including a hydraulic motor means for positioning said second rotatable shaft, a piston operatively connected to said second arm, a common hydraulic pressure source for operating said piston and motor means, said piston biased to a first position to cause said second arm to release said first mentioned arm upon the hydraulic operating pressure exceeding a predetermined value, and a spring for biasing said piston to a second position to cause said second arm to lock said first arm upon failure of the hydraulic operating pressure.

7. The combination comprising a first rotatable shaft, a second rotatable shaft, a walking beam, first means connecting said walking beam to the first and second shafts, a motor operatively connected to said second shaft, a control means for said motor, second means connecting said walking beam to said control means, said walking beam movable in a first sense for actuating said control means so as to effect movement of said second shaft by said motor, and said walking beam movable in a second sense for drivingly connecting said first and second shafts, means for limiting movement of said walking beam in said first sense so as to effect movement of said walking beam in said second sense and thereby drivingly connect said first shaft to said second shaft, and means for placing said limiting means out of operative relation so as to discontinue the driving relation between said first and second shafts.

HOWARD A. ALEXANDERSON.
ROBERT Z. HAGUE.

REFERENCES CITED

The following references are of record in the file of this patent or the original patent:

UNITED STATES PATENTS

| Number | Name | Date |
|---|---|---|
| 1,625,563 | Payne | Apr. 19, 1927 |
| 2,392,565 | Anderson | Jan. 8, 1946 |
| 2,431,590 | Smith | Nov. 25, 1947 |